Patented Sept. 21, 1926.

1,600,503

UNITED STATES PATENT OFFICE.

WALTER HOWELL DICKERSON, OF EAST ORANGE, NEW JERSEY.

ART OF RECOVERY OF SOLIDS FROM THEIR SOLUTIONS.

No Drawing.   Application filed November 12, 1921.   Serial No. 514,819.

The invention relates to a process for the recovery of solids from their solutions thru the atomization or spraying of the solutions under such conditions as to produce solid particles having a glazed surface, whereby the particles are rendered substantially non-hygroscopic.

The present application is a continuation in part of my co-pending application for U. S. Letters Patent, Serial No. 262,763, filed November 16th, 1918, and wherein there is disclosed a process for treating the waste liquors obtained in the production of paper pulp by the sulfite process, in manner such that a dry powdered product is obtained therefrom which has a glazed surface rendering said powder substantially non-hygroscopic; whereas the products heretofore obtained would coalesce under unfavorable atmospheric conditions into a pasty or a hard solid mass. These waste liquors, commonly known as waste sulfite liquors, are complex compounds of a generally brownish color which, when concentrated, form a viscid syrup or liquid having adhesive and binding properties.

In accordance with the process, the solution to be treated for the recovery of the solids contained therein is, preferably, first heated to approximately the boiling point of the solution, or superheated; and is then finely divided as by spraying or by atomizing.

The finely divided solution is then brought into contact with a gas at a temperature above the boiling point of the solution, the excess of temperature depending upon the character of the solution and particularly upon the desired characteristics of the finished product, but being initially high relatively to the critical temperature of the material being dried. In some instances, gas at temperatures as high as 1000° F. may be used in connection with solutions of organic materials. Also, the degree of subdivision of the solution is a factor in determining the character of the product obtained as to whether it shall be of small, dense particles or of large and more or less hollow and light particles.

It is of vital importance in the process to have the finely divided solution contact with the gas at the highest temperature of same employed; and, also, that the final gas temperature shall not fall below the boiling point of the solution. There is thus produced, apparently by the initially high temperature to which the finely divided solution is first subjected, an intense and exceedingly rapid evaporation and the effect of which is maintained thru the retention of the temperature of the gas above the boiling point of the solution. This results in producing upon the particles a hard and glazed surface which decreases greatly the tendency, subsequently, to agglomerate or coalesce into a solid mass, the individual particles being substantially non-hygroscopic. The term glazed particle used in this application to describe the physical character of the product obtained is intended to denote particles the material of which is smooth, shiny and glassy in appearance, is apparently unitary and homogeneous in structure and which in general resembles in physical appearance small drops or fragments of a soild amorphous substance such as glass. This is in contrast to a particle of rough, granular, composite character composed of a large number of independent component parts and clearly having the appearance of being an aggregate rather than a continuous amorphous mass.

I claim:—

1. The method of converting waste sulfite liquor into the form of dry glazed particles which comprises introducing the said liquor in finely divided condition into a current of heated gas at substantially the hottest portion thereof, conducting said material along with said gas through the drying chamber at a temperature sufficiently high to form the said glazed particles, and then separating and collecting said particles from the gas.

2. The method of converting liquid materials which at some degree of concentration are sticky, viscid and syrupy into the form of dry glazed particles which comprises spraying the said material into a current of heated drying gas at substantially the hottest portion thereof, permitting the said hot gas together with the said sprayed material to pass through the drying chamber and to remain in intermixed condition for a period of time sufficiently long to permit formation of the said glazed particles and then collecting the said glazed particles from the current of spent gas issuing from the drying chamber.

Signed at New York in the county of New York and State of New York this 10th day of November, A. D. 1921.

WALTER HOWELL DICKERSON.